United States Patent
Watabe et al.

(10) Patent No.: US 10,563,021 B2
(45) Date of Patent: Feb. 18, 2020

(54) METHODS FOR PRODUCING LIQUID COMPOSITION, COATING LIQUID FOR CATALYST LAYER AND MEMBRANE ELECTRODE ASSEMBLY

(71) Applicant: AGC Inc., Chiyoda-ku, Tokyo (JP)

(72) Inventors: Hiroyuki Watabe, Chiyoda-ku (JP); Satoru Hommura, Chiyoda-ku (JP); Toshihiro Tanuma, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 15/827,022

(22) Filed: Nov. 30, 2017

(65) Prior Publication Data

US 2018/0079872 A1 Mar. 22, 2018

Related U.S. Application Data

(63) Continuation of application No. PCT/JP2016/072683, filed on Aug. 2, 2016.

(30) Foreign Application Priority Data

Aug. 24, 2015 (JP) ................................ 2015-164627

(51) Int. Cl.
*H01M 4/00* (2006.01)
*C08J 3/09* (2006.01)
(Continued)

(52) U.S. Cl.
CPC ............ *C08J 3/093* (2013.01); *B05D 3/0254* (2013.01); *C08J 3/03* (2013.01); *C08J 3/095* (2013.01);
(Continued)

(58) Field of Classification Search
None
See application file for complete search history.

(56) References Cited

U.S. PATENT DOCUMENTS

2007/0286948 A1  12/2007  Shimoda et al.
2008/0138686 A1  6/2008  Kotera et al.
(Continued)

FOREIGN PATENT DOCUMENTS

JP  08-236122  9/1996
JP  2001-126739  5/2001
(Continued)

OTHER PUBLICATIONS

International Search Report dated Oct. 25, 2016 in PCT/JP2016/072683 filed Aug. 2, 2016.

*Primary Examiner* — Brian K Talbot
(74) *Attorney, Agent, or Firm* — Oblon, McClelland, Maier & Neustadt, L.L.P.

(57) ABSTRACT

To provide methods for producing a liquid composition, a coating liquid for a catalyst layer and a membrane electrode assembly, capable of making cracking less likely to occur at the time of forming a solid polymer electrolyte membrane or a catalyst layer. A copolymer having a structural unit represented by $-[CF_2-CF\{(OCF_2CFX)_mO_p(CF_2)_nSO_3H\}]-$ (wherein X: F or $CF_3$, m: 1 to 3, p: 0 or 1, and n: an integer of 1 to 12) and a structural unit derived from tetrafluoroethylene, is dispersed in a medium containing water and a hydrocarbon-type alcohol (but not including a fluorinated solvent) to prepare a dispersion wherein the concentration of the copolymer is from 13 to 26 mass %, and the dispersion and a fluorinated solvent are mixed so that the sum of the concentration of the copolymer and the concentration of the fluorinated solvent becomes to be from 17 to 35 mass %, to prepare a liquid composition.

10 Claims, 1 Drawing Sheet

(51) Int. Cl.
*H01M 4/88* (2006.01)
*C08J 5/22* (2006.01)
*H01M 8/1023* (2016.01)
*C09D 127/18* (2006.01)
*C09D 7/20* (2018.01)
*B05D 3/02* (2006.01)
*C08J 3/03* (2006.01)
*C09D 5/00* (2006.01)
*C09D 127/22* (2006.01)
*H01M 4/92* (2006.01)
*H01M 8/1004* (2016.01)
*H01M 8/1039* (2016.01)
*H01M 8/1011* (2016.01)
*C08F 214/26* (2006.01)
*H01M 8/1018* (2016.01)

(52) U.S. Cl.
CPC ............. *C08J 5/2237* (2013.01); *C09D 5/00* (2013.01); *C09D 7/20* (2018.01); *C09D 127/18* (2013.01); *C09D 127/22* (2013.01); *H01M 4/88* (2013.01); *H01M 4/881* (2013.01); *H01M 4/8807* (2013.01); *H01M 4/8828* (2013.01); *H01M 4/926* (2013.01); *H01M 8/1004* (2013.01); *H01M 8/1023* (2013.01); *H01M 8/1039* (2013.01); *C08F 214/262* (2013.01); *C08J 2327/22* (2013.01); *C08L 2203/20* (2013.01); *H01M 8/1011* (2013.01); *H01M 2008/1095* (2013.01); *Y02E 60/523* (2013.01)

(56) References Cited

U.S. PATENT DOCUMENTS

| 2009/0032179 | A1  |  2/2009 | Shimoda et al. |
| 2009/0291345 | A1* | 11/2009 | Hommura ........... H01M 4/8605 429/492 |
| 2010/0043954 | A1  |  2/2010 | Shimoda et al. |
| 2011/0027684 | A1  |  2/2011 | Murai et al. |
| 2011/0027688 | A1  |  2/2011 | Hommura et al. |
| 2011/0039189 | A1* |  2/2011 | Tanuma ................. H01M 4/86 429/516 |
| 2015/0044593 | A1  |  2/2015 | Tanuma et al. |

FOREIGN PATENT DOCUMENTS

| JP | 3394836 | 4/2003 | |
| JP | 2008-016431 | 1/2008 | |
| JP | 2009-037953 | 2/2009 | |
| JP | 2009037953 A * | 2/2009 | ........... B32B 37/025 |
| JP | 2009-301755 | 12/2009 | |
| JP | 2010-146965 | 7/2010 | |
| JP | 2012-018871 | 1/2012 | |
| WO | WO 2009/125695 A1 | 10/2009 | |
| WO | WO 2011/013578 A1 | 2/2011 | |

\* cited by examiner

METHODS FOR PRODUCING LIQUID COMPOSITION, COATING LIQUID FOR CATALYST LAYER AND MEMBRANE ELECTRODE ASSEMBLY

TECHNICAL FIELD

The present invention relates to methods for producing a liquid composition, a coating liquid for forming a catalyst layer and a membrane electrode assembly.

BACKGROUND ART

A solid polymer electrolyte fuel cell is, for example, one wherein a membrane electrode assembly is sandwiched between two separators to form a cell, and a plurality of such cells are stacked. The membrane electrode assembly is one comprising an anode and a cathode each having a catalyst layer, and a solid polymer electrolyte membrane disposed between the anode and the cathode.

The solid polymer electrolyte membrane in the membrane electrode assembly is formed, for example, by applying a liquid composition comprising a polymer having an ion exchange group, water and an organic solvent, followed by drying. Further, the catalyst layer in the membrane electrode assembly is formed, for example, by applying a coating liquid for forming a catalyst layer, having the liquid composition and a catalyst mixed, followed by drying (Patent Documents 1 and 2).

PRIOR ART DOCUMENTS

Patent Documents

Patent Document 1: JP-A-8-236122
Patent Document 2: JP-A-2010-146965

DISCLOSURE OF INVENTION

Technical Problem

Heretofore, the catalyst layer or the solid polymer electrolyte membrane containing a polymer having an ion exchange group has had such a problem that it is susceptible to cracking at the time when the coating liquid for forming a catalyst layer or the liquid composition is applied and then dried. In order to make cracking less likely to occur at the time of forming the catalyst layer or the solid polymer electrolyte membrane, it is conceivable to increase the viscosity of the coating liquid for forming a catalyst layer, or the liquid composition. And, in order to increase the viscosity of the coating liquid for forming a catalyst layer, or the liquid composition, it is conceivable to increase the concentration of the polymer having an ion exchange group in the coating liquid for forming a catalyst layer, or the liquid composition.

As the polymer having an ion exchange group, usually a copolymer (H) is used which has a structural unit represented by the formula (u1) as described later and a structural unit derived from tetrafluoroethylene. However, if the concentration of the copolymer (H) in the coating liquid for forming a catalyst layer, or the liquid composition, is made to be too high, the coating liquid for forming a catalyst layer, or the liquid composition, tends to be gelled, and it becomes difficult to form a uniform catalyst layer or solid polymer electrolyte. Therefore, there is a limitation for increasing the concentration of the copolymer (H) in the coating liquid for forming a catalyst layer, or the liquid composition, in order to bring the viscosity of the coating liquid for forming a catalyst layer, or the liquid composition, to be sufficiently high.

In Patent Document 1, in order to increase the viscosity of the coating liquid for forming a catalyst layer, it is proposed to use, as a dispersion medium, a mixed medium of a hydrocarbon-type alcohol and a fluorinated solvent. However, even in the coating liquid for forming a catalyst layer in Patent Document 1, the viscosity is not sufficiently high, and cracking is likely to occur at the time of forming the catalyst layer.

In Patent Document 2, in order to form a catalyst layer less susceptible to flooding, it is proposed to incorporate a fluorinated solvent to the dispersion medium for the coating liquid for forming a catalyst layer. However, in the coating liquid for forming a catalyst layer in Patent Document 2, the concentration of the copolymer (H) is low, whereby the viscosity is not high, and cracking is likely to occur at the time of forming a catalyst layer.

The present invention is to provide a method capable of producing a liquid composition which can make cracking less likely to occur at the time of forming a solid polymer electrolyte membrane; a method capable of producing a coating liquid for forming a catalyst layer, which can make cracking less likely to occur at the time of forming a catalyst layer; and a method for producing a membrane electrode assembly, which can make cracking less likely to occur at the time of forming a catalyst layer or a solid polymer electrolyte membrane.

Solution to Problem

The present invention has the following embodiments.

[1] A method for producing a liquid composition, which comprises dispersing a copolymer having a structural unit represented by the following formula (u1) and a structural unit derived from tetrafluoroethylene, in a medium containing water and a hydrocarbon-type alcohol and containing no fluorinated solvent, to prepare a dispersion wherein the concentration of the copolymer is from 13 to 26 mass %, and mixing the dispersion and a fluorinated solvent so that the sum of the concentration of the copolymer and the concentration of the fluorinated solvent becomes to be from 17 to 35 mass %, to prepare a liquid composition:

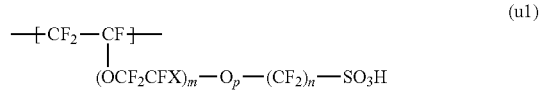
(u1)

wherein X is a fluorine atom or a trifluoromethyl group, m is an integer of from 1 to 3, p is 0 or 1, and n is an integer of from 1 to 12.

[2] The method for producing a liquid composition according to [1], wherein the structural unit represented by the formula (u1) is a structural unit represented by the following formula (u11) or formula (u12):

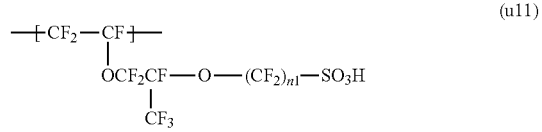
(u11)

-continued

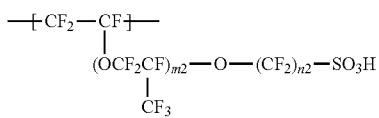
(u12)

wherein, in the formula (u11) and formula (u12), n1 and n2 are each an integer of from 1 to 8, and m2 is an integer of 2 or 3.

[3] The method for producing a liquid composition according to [1] or [2], wherein the fluorinated solvent is at least one member selected from the group consisting of a hydrofluoroether and a hydrofluorocarbon.

[4] The method for producing a liquid composition according to any one of [1] to [3], wherein the hydrocarbon-type alcohol is at least one $C_{1-4}$ hydrocarbon-type alcohol.

[5] The method for producing a liquid composition according to [3] or [4], wherein the hydrofluoroether is 1,1,2,2-tetrafluoroethyl-2,2,2-trifluoroethyl ether, and the hydrofluorocarbon is 1,1,2,2,3,3,4-heptafluorocyclopentane.

[6] The method for producing a liquid composition according to any one of [1] to [5], wherein the hydrocarbon-type alcohol is either one or both of ethanol and 1-propanol.

[7] The method for producing a liquid composition according to any one of [1] to [6], wherein the fluorinated solvent is 1,1,2,2,3,3,4-heptafluorocyclopentane, and the hydrocarbon-type alcohol is ethanol or 1-propanol.

[8] A method for producing a coating liquid for forming a catalyst layer, which comprises preparing a liquid composition by the method for producing a liquid composition as defined in any one of [1] to [7], and mixing the liquid composition and a catalyst to prepare a coating liquid for forming a catalyst layer.

[9] A method for producing a membrane electrode assembly for a solid polymer electrolyte fuel cell, comprising an anode having a catalyst layer, a cathode having a catalyst layer and a solid polymer electrolyte membrane disposed between the anode and the cathode, which comprises preparing a coating liquid for forming a catalyst layer by the method for producing a coating liquid for forming a catalyst layer as defined in [8], and forming the catalyst layer for either one or each of the cathode and the anode by using the coating liquid.

[10] A method for producing a membrane electrode assembly for a solid polymer electrolyte fuel cell, comprising an anode having a catalyst layer, a cathode having a catalyst layer and a solid polymer electrolyte membrane disposed between the anode and the cathode, which comprises preparing a liquid composition by the method for producing a liquid composition as defined in any one of [1] to [7], and forming the solid polymer electrolyte membrane by using the liquid composition.

Advantageous Effects of Invention

According to the method for producing a liquid composition of the present invention, it is possible to produce a liquid composition which can make cracking less likely to occur at the time of forming a solid polymer electrolyte membrane.

According to the method for producing a coating liquid for forming a catalyst layer of the present invention, it is possible to produce a coating liquid for forming a catalyst layer which can make cracking less likely to occur at the time of forming a catalyst layer.

According to the method for producing a membrane electrode assembly of the present invention, it is possible to make cracking less likely to occur at the time of forming a catalyst layer or a solid polymer electrolyte membrane.

DESCRIPTION OF EMBODIMENTS

Figure 1:
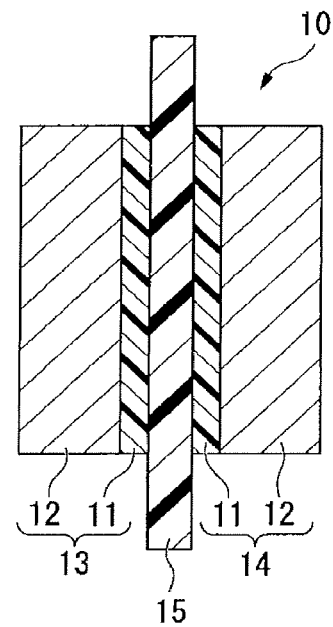
FIG. 1 is a schematic cross-sectional view showing an example of a membrane electrode assembly.

The following definitions of terms and manners for description will apply to the present specification including claims.

A structural unit represented by the formula (u1) will be referred to as a unit (u1). Structural units represented by other formulae will be referred to in the same manner.

A compound represented by the formula (m1) will be referred to as a compound (m1). Compounds represented by other formulae will be referred to in the same manner.

A "structural unit" means a unit derived from a monomer, which is formed by polymerization of the monomer. Also it means a unit in which, by treating a polymer constituted by a plurality of structural units, a part of the units is converted to another structure.

An "ion exchange group" means a group in which some of cations contained in the group can be replaced with other cations, and means a group having $H^+$, a monovalent metal cation, an ammonium ion, etc. The ion exchange group may, for example, be a sulfonic acid group, a sulfonimide group, a sulfone methide group, etc.

A "sulfonic acid group" includes —$SO_3^-H^+$ and —$SO_3^-M^+$ (wherein $M^+$ is a monovalent metal ion or an ammonium ion wherein at least one hydrogen atom may be substituted by a hydrocarbon group).

A "precursor group" means a group that can be converted to an ion exchange group by known treatment such as hydrolysis treatment, acid-form treatment, etc. The precursor group may, for example, be a —$SO_2F$ group, etc.

The "viscosity of a liquid composition" is a viscosity measured under conditions of a temperature of 25° C. and a shear rate of 10 s$^{-1}$.

<Liquid Composition>

The liquid composition obtainable by the production method of the present invention is one comprising the later-described copolymer (H) and the later-described dispersion medium, and one having the copolymer (H) dispersed in the dispersion medium. The liquid composition may contain other components other than the copolymer (H) and the dispersion medium, as the case requires, within a range not to impair the effects of the present invention.

The viscosity of the liquid composition is preferably from 500 to 500,000 mPa.s, more preferably from 1,000 to 500,000 mPa.s, further preferably from 1,000 to 100,000 mPa.s. When the viscosity of the liquid composition is at least the lower limit value in the above range, cracking is unlikely to occur at the time of forming a catalyst layer or a polymer electrolyte membrane. When the viscosity of the liquid composition is at most the upper limit value in the above range, it will be easy to apply the liquid composition.

The copolymer (H) is a copolymer having a structural unit (u1) and a structural unit derived from tetrafluoroethylene (hereinafter referred to also as TFE).

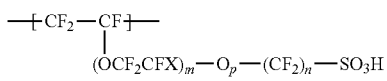
(u1)

Here, X is a fluorine atom or a trifluoromethyl group, m is an integer of from 1 to 3, p is 0 or 1, and n is an integer of from 1 to 12.

As the structural unit (u1), the structural unit (u11) or (u12) is preferred. Here, n1 and n2 are each an integer of from 1 to 8, and m2 is the integer of 2 or 3.

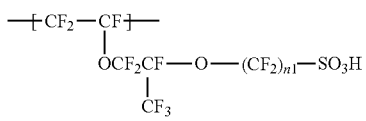
(u11)

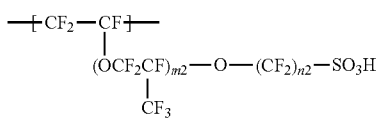
(u12)

The copolymer (H) is preferably a copolymer consisting of a structural unit (u1) and a structural unit derived from TFE, whereby cracking is less likely to occur at the time of forming a catalyst layer or an electrolyte membrane.

The copolymer (H) may have a structural unit derived from a monomer having no ion exchange group and having no ring structure (but excluding TFE), within a range not to impair the effects of the present invention.

The monomer having no ion-exchange group and having no ring structure may, for example, be chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl) ethylene (such as (perfluorobutyl) ethylene), a (perfluoroalkyl) propene (such as 3-perfluorooctyl-1-propene), a perfluoro(alkyl vinyl ether), etc.

The ion exchange capacity of the copolymer (H) is preferably from 0.6 to 2.0 meq/g dry resin, more preferably from 0.9 to 1.5 meq/g dry resin. When the ion exchange capacity is at least the lower limit value in the above range, the conductivity of the copolymer (H) will be high, whereby, when used in a catalyst layer of a solid polymer electrolyte fuel cell, it is possible to obtain a sufficient cell output. When the ion exchange capacity is at most the upper limit value in the above range, the production of the copolymer (H) will be easy.

The copolymer (H) may be produced by converting a —SO$_2$F group in a copolymer (F) having a structural unit derived from the compound (m1) and a structural unit derived from TFE to a sulfonic acid group.

$$CF_2{=}CF(OCF_2CFX)_mO_p(CF_2)_nSO_2F \qquad (m1)$$

Here, X is a fluorine atom or a trifluoromethyl group, m is an integer of from 1 to 3, p is 0 or 1, and n is an integer of from 1 to 12.

As the compound (m1), the compound (m11) or (m12) is preferred.

$$CF_2{=}CFOCF_2CF(CF_3)O(CF_2)_{n1}SO_2F \qquad (m11)$$

$$CF_2{=}CF(OCF_2CF(CF_3))_{m2}O(CF_2)_{n2}SO_2F \qquad (m12)$$

Here, n1 and n2 are each an integer of from 1 to 8, and m2 is an integer of 2 or 3.

The copolymer (F) is preferably a copolymer consisting of a structural unit derived from the compound (m1) and a structural unit derived from TFE, whereby cracking is less likely to occur at the time of forming a catalyst layer or an electrolyte membrane.

As a method for converting a —SO$_2$F group to a sulfonic acid group (—SO$_3^-$H$^+$ group), a method may be mentioned wherein a —SO$_2$F group of the copolymer (F) is hydrolyzed to a sulfonic acid salt, and the sulfonic acid salt is converted to an acid form i.e. to a sulfonic acid group.

The dispersion medium comprises water, a hydrocarbon-type alcohol and a fluorinated solvent. The dispersion medium may also contain other solvents other than water, a hydrocarbon-type alcohol and a fluorinated solvent, as the case requires, within a range not to impair the effects of the present invention.

Water will improve the dispersibility of the copolymer (H) to the dispersion medium.

The hydrocarbon-type alcohol will improve the dispersibility of the copolymer (H) to the dispersion medium, and will make cracking less likely to occur at the time of forming a catalyst layer or a polymer electrolyte membrane.

The fluorinated solvent will, by being combined with water and the hydrocarbon-type alcohol, sufficiently thicken the liquid composition, and will make cracking further less likely to occur at the time of forming a catalyst layer or a polymer electrolyte membrane.

The hydrocarbon-type alcohol is one having at least one hydrogen of an aliphatic hydrocarbon compound or an aromatic compound containing no fluorine atom substituted by a hydroxy group. Among them, preferred is one having at least one hydrogen of a linear or branched aliphatic hydrocarbon compound having no fluorine atom substituted by a hydroxy group.

As the hydrocarbon-type alcohol, from such a viewpoint that the dispersibility of the polymer is good, and it is easy to prepare a dispersion, at least one $C_{1-4}$, preferably $C_{1-3}$, alcohol is preferred.

The $C_{1-4}$ alcohol may, for example, be methanol, ethanol, 1-propanol, 2-propanol, 1-butanol, 2-butanol, 2-methyl-1-propanol, 2-methyl-2-propanol, etc. Especially from such a viewpoint that the dispersibility of the polymer is good, and it is easy to prepare a dispersion, either one or both of ethanol and 1-propanol are preferred.

Further, the boiling point of the hydrocarbon-type alcohol is preferably from 40 to 150° C., more preferably from 45 to 120° C. Particularly, either one or both of ethanol and 1-propanol are preferred from such a viewpoint that the dispersibility of the polymer will be good, and at the time of forming a solid polymer electrolyte membrane or a catalyst layer, the boiling point will be low so that it will be easy to remove the alcohol.

The fluorinated solvent may, for example, be a hydrofluoroether, a hydrofluorocarbon, a hydrochlorofluorocarbon, a chlorofluorocarbon, a fluorinated alcohol, etc. From such a viewpoint that cracking is less likely to occur at the time of forming a catalyst layer or a polymer electrolyte membrane, at least one member selected from the group consisting of a hydrofluoroether and a hydrofluorocarbon is preferred.

The hydrofluoroether may, for example, be 1,1,2,2-tetrafluoroethyl-2,2,2-trifluoroethyl ether, methyl-1,1,1,2,3,3-hexafluoro-propyl ether, methyl-nonafluorobutyl ether, methyl-nonafluoroisobutyl ether, ethyl nonafluorobutyl ether, ethyl-nonafluoroisobutyl ether, 4-methyl-1,1,1,2,3,3- hexafluorobutyl-1,1,2,3,3,3-hexafluoro-propyl ether, etc. As the hydrofluoroether, 1,1,2,2-tetrafluoroethyl-2,2,2-trifluoroethyl ether is preferred from such a viewpoint that the effect to increase the viscosity of the dispersion will be particularly high.

The hydrofluorocarbon may, for example, be 1,1,2,2,3,3,4-heptafluoro cyclopentane, 1,1,1,2,3,3-hexafluoropropane, 1,1,2,2,3,3,4,4-octafluoro-butane, 1,1,1,2,3,4,4,5,5,5-decafluoropentane, 1,1,1,2,3,4,5,5,5-nonafluoro-2-(trifluoromethyl)-pentane, 1,1,1,2,3,3,4,4,5,6,6,6-dodecafluoro hexane, 1,1,1,2,3,4,4,5,5,5-decafluoro-2-(trifluoromethyl)-pentane, 1,2,3,3,4,4-hexafluoro-1,2-di(trifluoromethyl)-cyclobutane, 1,1,1,2,2-pentafluorobutane, 1,1,1,2,2,3,3,4,4,5,5,6,6-tridecafluoro-hexane, 1,1,1,2,2,3,3,4,4,5,5,6,6,8,8,8-hexadecafluoro-octane, etc. As the hydrofluorocarbon, 1,1,2,2,3,3,4-heptafluorocyclopentane is more preferred from such a viewpoint that the effect to increase the viscosity of the dispersion will be particularly high.

As a combination of a hydrocarbon-type alcohol and a fluorinated solvent, to be combined with water, preferred is a combination of (ethanol and 1,1,2,2-tetrafluoroethyl-2,2,2-trifluoroethyl ether), (1-propanol and 1,1,2,2-tetrafluoroethyl-2,2,2-trifluoroethyl ether), (ethanol, 1-propanol and 1,1,2,2-tetrafluoroethyl-2,2,2-trifluoroethyl ether), (ethanol and 1,1,2,2,3,3,4-heptafluoro cyclopentane), (1-propanol and 1,1,2,2,3,3,4-heptafluorocyclopentane), or (ethanol, 1-propanol and 1,1,2,2,3,3,4-heptafluorocyclopentane). With a view to thickening the liquid composition and making cracking less likely to occur at the time of forming a catalyst layer or a polymer electrolyte membrane, more preferred is a combination of (ethanol and 1,1,2,2,3,3,4-heptafluorocyclopentane), or (1-propanol and 1,1,2,2,3,3,4-heptafluorocyclopentane).

The proportion of water is, in the dispersion medium (100 mass %), preferably from 3 to 95 mass %, more preferably from 10 to 80 mass %. When the proportion of water is at least the lower limit value in the above range, the dispersibility of the copolymer (H) to the dispersion medium will be excellent. When the proportion of water is at most the upper limit value in the above range, the effects due to the hydrocarbon-type alcohol and the fluorinated solvent will be sufficiently exhibited.

The proportion of the hydrocarbon-type alcohol is, in the dispersion medium (100 mass %), preferably from 2 to 94 mass %, more preferably from 15 to 85 mass %. When the proportion of the hydrocarbon-type alcohol is at least the lower limit value in the above range, the dispersibility of the copolymer (H) to the dispersion medium will be excellent, and cracking will be less likely to occur at the time of forming a catalyst layer or a polymer electrolyte membrane. When the proportion of the hydrocarbon-type alcohol is at most the upper limit value in the above range, the effects due to water and the fluorinated solvent will be sufficiently exhibited.

The proportion of the fluorinated solvent is, in the dispersion medium (100 mass %), preferably from 3 to 25 mass %, more preferably from 5 to 20 mass %. When the proportion of the fluorinated solvent is at least the lower limit value in the above range, cracking will be further less likely to occur at the time of forming a catalyst layer or a polymer electrolyte membrane. When the proportion of the fluorinated solvent is at most the upper limit value in the above range, the effects due to water and the hydrocarbon-type alcohol will be sufficiently exhibited.

The concentration of the copolymer (H) is, in the liquid composition (100 mass %), preferably from 12.4 to 25.7 mass %, more preferably from 15 to 22 mass %. When the concentration of the copolymer (H) is at least the lower limit value in the above range, it will be easy to increase the viscosity of the liquid composition. When the concentration of the copolymer (H) is at most the upper limit value in the above range, the viscosity of the liquid composition will not be too high, and it becomes easy to form a uniform catalyst layer or solid polymer electrolyte.

The liquid composition is suitably used for forming a catalyst layer or polymer electrolyte membrane in a membrane electrode assembly. Further, it is useful also for forming other membranes (such as proton permselective membranes to be used in water electrolysis, hydrogen peroxide production, ozone production, spent acid recovery, etc., cation exchange membranes for sodium chloride electrolysis, diaphragms for a redox flow battery, cation exchange membranes for electrodialysis to be used for desalination or salt production, etc.).

<Method for Producing Liquid Composition>

The method for producing a liquid composition of the present invention, comprises a step of dispersing the copolymer (H) in a medium containing water and a hydrocarbon-type alcohol (but not including a fluorinated solvent) to prepare a dispersion wherein the concentration of the copolymer (H) is from 13 to 26 mass %, and a step of mixing the dispersion and a fluorinated solvent after the above step, so that the sum of the concentration of the copolymer (H) and the concentration of the fluorinated solvent becomes to be from 17 to 35 mass %, to prepare a liquid composition.

The dispersion may be prepared by mixing the copolymer (H) and the medium (water and the hydrocarbon-type alcohol), followed by stirring. The medium may contain other solvents other than water, the hydrocarbon-type alcohol and the fluorinated solvent, as the case requires, within a range not to impair the effects of the present invention. Further, the dispersion may contain other components other than the copolymer (H) and the medium, as the case requires, within a range not to impair the effects of the present invention.

The dispersion may be prepared, for example, in accordance with the preparation methods described in JP-B-4-35226, JP-A-2001-504872, JP-A-2005-82749, WO2006/38928, JP-A-2004-519296, etc.

As a specific method for preparing the dispersion, a method of exerting shearing by e.g. stirring to the copolymer (H) in a medium under such a state as closed in e.g. an autoclave, may be mentioned. As the case requires, shearing by e.g. ultrasonic waves, may be applied.

In the case of exerting shearing by e.g. stirring to a mixed liquid having the copolymer (H) and the medium mixed, shearing by e.g. stirring may be applied to a mixed liquid having the medium added all at once to the copolymer (H), or the medium may be added dividedly in a plurality of times to the copolymer (H) and shearing by e.g. stirring may be applied in between. For example, shearing by e.g. stirring may be exerted to a mixed liquid having a part of the hydrocarbon-type alcohol and a part of water added to the copolymer (H), and thereafter, the remaining medium may be added to the mixed liquid, followed by exerting shearing by e.g. stirring again. Otherwise, only the hydrocarbon-type alcohol may be added to the copolymer (H), followed by exerting shearing by e.g. stirring, and thereafter, only water may be added, followed by exerting shearing by e.g. stirring again.

The temperature at the time of preparing the dispersion is preferably from 80 to 180° C., more preferably from 100 to 130° C. The time is preferably from 1 to 48 hours, more preferably from 2 to 24 hours.

The concentration of the copolymer (H) is, in the dispersion (100 mass %), from 13 to 26 mass %, preferably from 15 to 26 mass %, more preferably from 18 to 26 mass %. When the concentration of the copolymer (H) is at least the lower limit value in the above range, the viscosity of the liquid composition in step (β) can easily be made high. When the concentration of the copolymer (H) is at most the upper limit value in the above range, the viscosity of the liquid composition in step (β) will not be too high, and it will be easy to form a uniform catalyst layer or solid polymer electrolyte.

The proportion of water is, in the total (100 mass %) of water and the hydrocarbon-type alcohol, preferably from 3 to 98 mass %, more preferably from 11 to 84 mass %. When the proportion of water is at least the lower limit value in the above range, the dispersibility of the copolymer (H) to the medium will be excellent. When the proportion of water is at most the upper limit value in the above range, the effect due to the hydrocarbon-type alcohol will be sufficiently exhibited.

The proportion of the hydrocarbon-type alcohol is, in the total (100 mass %) of water and the hydrocarbon-type alcohol, preferably from 2 to 97 mass %, more preferably from 16 to 89 mass %. When the proportion of the hydrocarbon-type alcohol is at least the lower limit value in the above range, the dispersibility of the copolymer (H) to the medium will be excellent, and cracking tends to be further less likely to occur at the time of forming a catalyst layer or a polymer electrolyte membrane. When the proportion of the hydrocarbon-type alcohol is at most the upper limit value in the above range, the effect due to the water will be sufficiently exhibited.

The liquid composition is prepared by mixing the dispersion and a fluorinated solvent, followed by stirring. The dispersion medium in the liquid composition may contain other solvents other than water, a hydrocarbon-type alcohol and a fluorinated solvent, as the case requires, within a range not to impair the effects of the present invention. Further, the liquid composition may contain other components other than the copolymer (H) and the dispersion medium, as the case requires, within a range not to impair the effects of the present invention.

The stirring means may be a known stirring apparatus having stirring blades, or a known stirring apparatus using no stirring blades. The stirring blades may, for example, be blade vanes, anchor blades, ribbon blades, pitched paddles, pitched turbines, three propellers, a serrated disc turbine, portal wings, etc. As the stirring blades, one type may be used alone, or two or more types may be used in combination. As a stirring apparatus provided with stirring blades, which is suitable for stirring a high viscosity solution, specifically, a stirring apparatus of a biaxial planetary system may be mentioned wherein two blade vanes perform revolution and rotation movements simultaneously (manufactured by PRIMIX Corporation, HIVIS mix). As a stirring apparatus capable of stirring a high viscosity solution without using stirring blades, a planetary centrifugal mixer performing stirring and mixing by a centrifugal force of rotation and revolution, may be mentioned.

The temperature of the mixed liquid during the stirring is preferably from 10 to 40° C., more preferably from 20 to 30° C. When the temperature of the mixed liquid is at least the lower limit value in the above range, the viscosity of the liquid composition can be easily made to be high. When the temperature of the mixed liquid is at most the upper limit value in the above range, the viscosity of the liquid composition will not be too high, and it will be easy to form a uniform catalyst layer or solid polymer electrolyte.

The stirring time is preferably from 0.5 minute to 16 hours, more preferably from 1 minute to 2 hours. When the stirring time is at least the lower limit value in the above range, the viscosity of the liquid composition can be easily made to be high. When the stirring time is at most the upper limit value in the above range, the production time for the liquid composition will not be too long.

The shear rate during the stirring is preferably from 1 to 1,000 $s^{-1}$, more preferably from 5 to 100 $s^{-1}$. When the shear rate is at least the lower limit value in the above range, the viscosity of the liquid composition can be easily made to be high. When the shear rate is at most the upper limit value in the above range, the viscosity of the liquid composition will not be too high, and it will be easy to form a uniform catalyst layer or solid polymer electrolyte.

The sum of the concentration of the copolymer (H) and the concentration of the fluorinated solvent in the liquid composition (100 mass %), is from 17 to 35 mass %, preferably from 20 to 35 mass %, more preferably from 25 to 34 mass %. When the sum of the concentration of the copolymer (H) and the concentration of the fluorinated solvent is at least the lower limit value in the above range, the viscosity of the liquid composition will be sufficiently high. When the sum of the concentration of the copolymer (H) and the concentration of the fluorinated solvent is at most the upper limit value in the above range, the viscosity of the liquid composition will not be too high, and it will be easy to form a uniform catalyst layer or solid polymer electrolyte.

In the method for producing a liquid composition of the present invention as described above, preliminarily the copolymer (H) is dispersed in a medium containing water and a hydrocarbon-type alcohol (but not including a fluorinated solvent) to prepare a dispersion in which the concentration of the polymer (H) is relatively high, and then, the dispersion and a fluorinated solvent having a thickening effect are mixed without decreasing the concentration of the copolymer (H) so much, whereby the viscosity of the liquid composition tends to be sufficiently high. And, the fluorinated solvent may, by being combined with the water and the hydrocarbon-type alcohol, be able to sufficiently thicken the liquid composition, whereby the viscosity of the liquid composition will be sufficiently high as compared with a conventional liquid composition obtained by combining a fluorinated solvent and a hydrocarbon-type alcohol and containing no water. Therefore, according to the method for producing a liquid composition of the present invention, it is possible to produce a liquid composition which can make cracking unlikely to occur at the time of forming a solid polymer electrolyte membrane.

<Coating Liquid for Forming Catalyst Layer>

The coating liquid for forming a catalyst layer obtainable by the production method of the present invention, is one comprising the copolymer (H), a catalyst and a dispersion medium, and one having the copolymer (H) and the catalyst dispersed in the dispersion medium. The coating liquid for forming a catalyst layer may contain other components other than the copolymer (H), the catalyst and the dispersion medium, as the case requires, within a range not to impair the effects of the present invention.

As the catalyst, a supported catalyst having platinum or a platinum alloy supported on a carbon carrier may be mentioned. The carbon carrier may be carbon black powder.

The dispersion medium in the coating liquid for forming a catalyst layer, is a mixture of a dispersion medium contained in the liquid composition and a dispersion medium contained in the dispersion of the catalyst as described later.

The solid content concentration in the coating liquid for forming a catalyst layer may suitably be adjusted so as to bring the viscosity to be easy for coating and so that cracking will be unlikely to occur at the time of forming a catalyst layer.

The mass ratio of the copolymer (H) to the catalyst in the coating liquid for forming a catalyst layer may be suitably adjusted depending on the performance, etc. required for the catalyst layer.

<Method for Producing Coating Liquid for Forming Catalyst Layer>

The method for producing a coating liquid for forming a catalyst layer of the present invention, may be a method which has, after the above described step of preparing a liquid composition, a step of mixing the liquid composition and a catalyst to prepare a coating liquid for forming a catalyst layer.

The coating liquid for forming a catalyst layer may be prepared, for example, by mixing the liquid composition in the present invention, with a catalyst or a dispersion of a catalyst, followed by stirring. The coating liquid for forming a catalyst layer may contain other components other than the copolymer (H), the catalyst and the dispersion medium, as the case requires, within a range not to impair the effects of the present invention.

The dispersion of a catalyst is one having a catalyst dispersed in a dispersion medium.

The dispersion medium to be contained in the dispersion of a catalyst may, for example, be water, an organic solvent, etc., and a medium containing water and a hydrocarbon-type alcohol, is preferred.

As the method for preparing the coating liquid for forming a catalyst layer, known methods may be mentioned. Specifically, a method of utilizing high speed rotation by a stirrer such as a homogenizer, a homomixer, etc., a high-speed rotation jet stream, a grinder, etc.; a method of imparting a shearing force to the coating liquid by extruding the coating liquid from a narrow portion by applying a high pressure of e.g. a high-pressure emulsifying apparatus; a method of dispersing a dispersoid in the dispersion medium by applying a high energy such as ultrasonic waves; a method of dispersing a dispersoid in the dispersion medium by collision of beads one another by a bead mill; etc. may be mentioned. The temperature of the coating liquid during the preparation is preferably from 5 to 50° C., more preferably from 10 to 30° C.

In the method for producing a coating liquid for forming a catalyst layer of the present invention as described above, the liquid composition with a sufficiently high viscosity and the catalyst are mixed, whereby the viscosity of the coating liquid for forming a catalyst layer becomes to be sufficiently high. Therefore, according to the method for producing a coating liquid for forming a catalyst layer of the present invention, it is possible to produce a coating liquid for forming a catalyst layer which is capable of making cracking less likely to occur at the time of forming a catalyst layer.

<Membrane Electrode Assembly>

FIG. 1 is a schematic cross-sectional view showing an example of a membrane electrode assembly. A membrane electrode assembly 10 comprises an anode 13 having a catalyst layer 11 and a gas diffusion layer 12, a cathode 14 having a catalyst layer 11 and a gas diffusion layer 12, and a solid polymer electrolyte membrane 15 disposed between the anode 13 and the cathode 14, in a state in contact with the catalyst layers 11.

The catalyst layer is a layer containing a catalyst and a polymer having an ion exchange group.

As the polymer having an ion exchange group, from the viewpoint of excellent chemical durability, preferred is a fluorinated polymer having an ion exchange group, more preferred is a perfluoropolymer having all hydrogen atoms bonded to carbon atoms substituted by fluorine atoms and having an ion exchange group, and further preferred is a copolymer (H).

The gas diffusion layer has a function to uniformly diffuse a gas into the catalyst layer and a function as a current collector. The gas diffusion layer may, for example, be carbon paper, carbon cloth, carbon felt, etc. The gas diffusion layer is preferably treated for water repellency by e.g. polytetrafluoroethylene.

Figure 2:
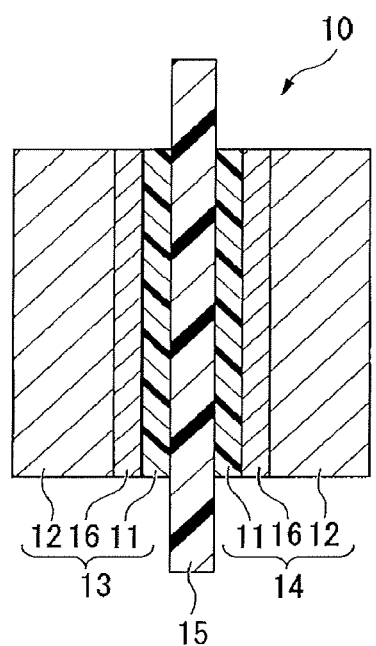
FIG. 2 is a schematic cross-sectional view showing another example of a membrane electrode assembly.

As shown in FIG. 2, the membrane electrode assembly 10 may have a carbon layer 16 between the catalyst layer 11 and the gas diffusion layer 12.

By disposing the carbon layer, the gas diffusion property at the surface of the catalyst layer will be improved, and the power generation performance of the solid polymer electrolyte fuel cell will be substantially improved.

The carbon layer is a layer containing carbon and a nonionic fluorinated polymer. The carbon may, for example, be carbon particles, carbon fibers, etc., and carbon nanofibers having a fiber diameter of from 1 to 1,000 nm and a fiber length of at most 1,000 μm are preferred. The nonionic fluorinated polymer may, for example, be polytetrafluoroethylene, etc.

The solid polymer electrolyte membrane is a membrane comprising a polymer having an ion exchange group. As the polymer having an ion exchange group, the above-mentioned perfluoro polymer having an ion exchange group may, for example, be mentioned, and the polymer (H) is preferred.

The solid polymer electrolyte membrane may be reinforced with a reinforcing material. The reinforcing material may, for example, be porous material, fibers, woven fabrics, nonwoven fabrics, etc. The material for the reinforcing material may, for example, be polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide, etc.

The solid polymer electrolyte membrane may, in order to further improve the durability, contain at least one type of atoms selected from the group consisting of cerium and manganese. Cerium and manganese will decompose hydrogen peroxide which is a substance causing deterioration of the solid polymer electrolyte membrane.

Such cerium and manganese are preferably present in the form of ions in the solid polymer electrolyte membrane, and so long as they are present in the form of ions, they may be present in any state in the solid polymer electrolyte membrane.

<Method for Producing Membrane Electrode Assembly>

In a case where a membrane electrode assembly has no carbon layer, the membrane electrode assembly may be produced, for example, by the following methods.

A method of forming a catalyst layer on a solid polymer electrolyte membrane to obtain a membrane catalyst layer assembly, and sandwiching the membrane catalyst layer assembly by gas diffusion layers.

A method of forming a catalyst layer on a gas diffusion layer to obtain an electrode (anode, cathode), and sandwiching a solid polymer electrolyte membrane by such electrodes.

In a case where the membrane electrode assembly has carbon layers, the membrane electrode assembly may be produced, for example, by the following methods.

A method of applying a dispersion containing carbon and a nonionic fluorinated polymer, on a substrate film, followed by drying to form a carbon layer, forming a catalyst layer on the carbon layer, bonding the catalyst layer and a solid polymer electrolyte membrane, then peeling the substrate film to obtain a membrane-catalyst layer assembly having carbon layers, and sandwiching the membrane catalyst layer assembly by gas diffusion layers.

A method of applying a dispersion containing carbon and a nonionic fluorinated polymer, on a gas diffusion layer, followed by drying to form a carbon layer, and sandwiching a membrane catalyst layer assembly having a catalyst layer formed on a solid polymer electrolyte membrane, by such gas diffusion layers having carbon layers.

The method for producing a membrane electrode assembly of the present invention may be a method which has, after the above-described step of preparing a coating liquid for forming a catalyst layer, a step of forming either one or both of catalyst layers of the cathode and the anode by using the coating liquid for forming a catalyst layer.

As the method for forming a catalyst layer, the following methods may be mentioned.

A method of applying the coating liquid for forming a catalyst layer, on a solid polymer electrolyte membrane, a gas diffusion layer or a carbon layer, followed by drying.

A method of applying the coating liquid for forming a catalyst layer on a substrate film, followed by drying to form a catalyst layer, and transferring the catalyst layer on a solid polymer electrolyte membrane.

The method for producing a membrane electrode assembly of the present invention may be a method which has, after the above-described step of preparing a coating liquid for forming a catalyst layer, a step of forming a solid polymer electrolyte membrane by using a liquid composition.

The solid polymer electrolyte membrane may be formed, for example, by a method of applying a liquid composition on a substrate film or a catalyst layer, followed by drying (casting method).

In order to stabilize the solid polymer electrolyte membrane, it is preferred to carry out annealing treatment. The temperature for the annealing treatment is preferably from 130 to 200° C. When the temperature for the annealing treatment is at least 130° C., the copolymer (H) will not be excessively hydrated. When the temperature for the annealing treatment is at most 200° C., it is possible to prevent thermal decomposition of ion exchange groups.

In the method for producing a membrane electrode assembly of the present invention as described above, the liquid composition of the present invention is used for the formation of a catalyst layer or a solid polymer electrolyte membrane, whereby cracking is less likely to occur at the time of forming the catalyst layer or the solid polymer electrolyte membrane.

<Solid Polymer Electrolyte Fuel Cell>

A solid polymer electrolyte fuel cell is obtainable by disposing a separator with grooves formed as gas passages, on each side of a membrane electrode assembly.

As the separator, a separator made of various conductive material may be mentioned, such as a separator made of metal, a separator made of carbon, or a separator made of a material having graphite and a resin mixed.

In the solid polymer electrolyte fuel cell, power generation is performed by supplying a gas containing oxygen to the cathode, and supplying a gas containing hydrogen to the anode. Further, the membrane electrode assembly may be applied also to a methanol fuel cell wherein power generation is conducted by supplying methanol to the anode.

EXAMPLES

Hereinafter, the present invention will be described in detail with reference to Examples, but the present invention is not limited by these Examples. Here, Ex. 1 to 7 are Examples of the present invention, and Ex. 8 to 12 are Comparative Examples.

(Ion Exchange Capacity)

The ion exchange capacity of the polymer (H) was obtained by the following method.

The polymer (H) was put in a glove box and left for at least 24 hours in an atmosphere flushed with dry nitrogen, and dried. In the glove box, the dry weight of the polymer (H) was measured.

The polymer (H) was immersed in a 2 mol/L (liter) sodium chloride aqueous solution and left to stand at 60° C. for 1 hour, and then, cooled to room temperature.

The sodium chloride aqueous solution in which the polymer (H) had been immersed, was titrated with a 0.5 mol/L sodium hydroxide aqueous solution, to obtain the ion exchange capacity of the polymer (H).

(Cracking of Catalyst Layer)

The presence or absence of cracking in the catalyst layer was visually confirmed and the evaluation was made in accordance with the following standards.

◉ (excellent): The catalyst layer is formed without cracking, and light does not pass through the catalyst layer.

○ (good): Cracking of the catalyst layer is extremely small, and light slightly passes through the catalyst layer.

x (poor): Cracking of the catalyst layer is large, and the catalyst layer falls off from the substrate.

Compound (m11-1):

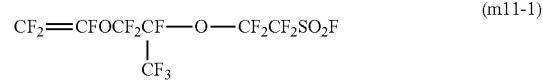

(m11-1)

Compound (i-1): 2,2'-azobis(dimethyl isobutyrate) (manufactured by Wako Pure Chemical Industries, Ltd., V-601).

Compound (s-1): $CF_3CF_2CF_2CF_2CF_2CF_2H$ (s-1) (manufactured by Asahi Glass Company, Limited, ASAHIKLIN (registered trademark) AC-2000).

Compound (s-2): $CF_3CH_2OCF_2CF_2H$ (s-2) (manufactured by Asahi Glass Company, Limited, ASAHIKLIN (registered trademark) AE-3000).

Compound (d-1): 1,1,2,2,3,3,4-heptafluorocyclopentane (manufactured by ZEON Corporation, ZEORORA (registered trademark) H).

(Copolymer (H))

Production of Copolymer (H-1):

Into a stainless steel autoclave having an internal capacity of 230 mL, 100.41 g of the compound (m1-1), 55.0 g of the compound (s-1) and 15.5 mg of the compound (i-1) were charged and, under cooling with liquid nitrogen, sufficiently degassed. Thereafter, the temperature was raised to 70° C., and TFE was introduced into the system, to maintain the pressure to be 1.00 MPaG. After stirring for 8.5 hours, the autoclave was cooled to stop the reaction.

The product was diluted with the compound (s-1), and then, compound (s-2) was added thereto to agglomerate the polymer, followed by filtration. Then, the polymer was washed with a mixed liquid of the compound (s-1): the compound (s-2)=1:9 (mass ratio) and dried under reduced pressure at 80° C. overnight, to obtain a copolymer (F-1). The composition of structural units constituting the copolymer (F-1) was obtained from the measurement of the ion exchange capacity.

The copolymer (F-1) was immersed for 40 hours in an aqueous solution of 50° C. containing 20 mass % of methanol and 15 mass % of potassium hydroxide, to let —$SO_2F$ groups in the copolymer (F-1) be hydrolyzed and converted to —$SO_3K$ groups. Then, the copolymer was immersed in a 3 mol/L hydrochloric acid aqueous solution at room temperature for 2 hours. By replacing the hydrochloric acid aqueous solution, the same treatment was further repeated four times, to obtain a copolymer (H-1) having —$SO_3K$ groups in the copolymer converted to sulfonic acid groups. The copolymer (H-1) was sufficiently washed with ultrapure water. The ion exchange capacity of the copolymer (H-1) was measured. The results are shown in Table 1.

Production of Copolymers (H-2) and (H-3):

The copolymers (H-2) and (H-3) were produced in the same manner as the copolymer (H-1) except that the charged amounts of the respective monomers were changed so that the proportions of the respective structural units became to be the proportions shown in Table 1. The results are shown in Table 1.

TABLE 1

| Copolymer | Structural unit [mol %] | | Copolymer | Ion exchange capacity |
|---|---|---|---|---|
| (F) | (m11-1) | TFE | (H) | [meq/g dry resin] |
| (F-1) | 18 | 82 | (H-1) | 1.10 |
| (F-2) | 23 | 77 | (H-2) | 1.26 |
| (F-3) | 28 | 72 | (H-3) | 1.41 |

(Ex. 1)

The copolymer (H-1) and a mixed solvent of water and ethanol (water/ethanol=40/60 mass ratio) were mixed so that the concentration of the copolymer (H) became 13 mass %, and stirred by using a Hastelloy autoclave at 105° C. for 8 hours at a rotation speed of 150 rpm, to prepare a dispersion.

The above dispersion and a compound (d-1) were mixed so that the sum of the concentration of the copolymer (H-1) and the concentration of the compound (d-1) became 17 mass %, followed by mixing by using a planetary centrifugal mixer (manufactured by THINKY CORPORATION, ARE-310) at 25° C. at a revolution rate of 2,000 rpm at a rotation rate of 800 rpm for 5 minutes, to prepare a liquid composition.

To 10 g of a catalyst (manufactured by Tanaka Kikinzoku Kogyo K.K.) having platinum supported on a carbon carrier (specific surface area: 800 $m^2$/g) so as to be contained in an amount of 50 mass % in the total mass of the catalyst, 44 g of ultrapure water was added, followed by irradiation with ultrasonic waves for 10 minutes, to prepare a dispersion of the catalyst. Thereto, 32 g of the liquid composition was added and further 88 g of ethanol was added to bring the solid content concentration to be 8 mass %, and to bring the mass ratio of the copolymer (H-1) to the carbon carrier "(copolymer)/(carbon carrier)" to be 0.8, to obtain a coating liquid for forming a catalyst layer.

The coating liquid for forming a catalyst layer was applied to a sheet (manufactured by Asahi Glass Company, Limited, Aflex (registered trademark) 100 N, thickness: 100 μm) made of an ethylene-tetrafluoroethylene copolymer, so that a catalyst layer with a platinum amount of 0.2 mg/$cm^2$ would be formed, followed by drying at 80° C. for 10 minutes to form a catalyst layer. The presence or absence of cracking in the catalyst layer was confirmed. The results are shown in Table 2.

(Ex. 2 to 12)

In the same manner as in Ex. 1 except that the type of the copolymer, the type of the medium and their proportions, used for the production, were changed as shown in Table 2, the liquid composition and the coating liquid for forming a catalyst layer were obtained, and a catalyst layer was formed. The results are shown in Table 2.

TABLE 2

| Ex. | Copolymer (H) | Hydrocarbon-type alcohol | Water/hydrocarbon-type alcohol [mass ratio] | Concentration of copolymer [mass %] | Fluorinated solvent | Concentration of copolymer + fluorinated solvent [mass %] | Cracking of catalyst layer |
|---|---|---|---|---|---|---|---|
| 1 | (H-1) | EtOH | 40/60 | 13 | (d-1) | 17 | ○ |
| 2 | (H-1) | EtOH | 40/60 | 20 | (d-1) | 27 | ⊚ |
| 3 | (H-1) | EtOH | 40/60 | 26 | (d-1) | 34 | ⊚ |
| 4 | (H-2) | EtOH | 40/60 | 20 | (d-1) | 30 | ⊚ |
| 5 | (H-2) | EtOH | 40/60 | 15 | (d-1) | 23 | ○ |
| 6 | (H-3) | EtOH | 50/50 | 20 | (d-1) | 33 | ⊚ |
| 7 | (H-3) | EtOH | 50/50 | 25 | (d-1) | 35 | ⊚ |
| 8 | (H-1) | EtOH | 14/86 | 10 | (d-1) | 35 | X |
| 9 | (H-1) | EtOH | 40/60 | 26 | (d-1) | 36 | — |
| 10 | (H-1) | EtOH | 40/60 | 26 | — | 26 | X |
| 11 | (H-1) | EtOH | 40/60 | 13 | (d-1) | 16 | X |
| 12 | (H-1) | — | 100/0 | 20 | (d-1) | 27 | — |

In Ex. 1 to 7, a dispersion having a concentration of the copolymer (H) of from 13 to 26 mass % and a fluorinated solvent were mixed so that the sum of the concentration of the copolymer (H) and the concentration of the fluorinated solvent became to be from 17 to 35 mass %, to prepare a liquid composition, whereby the viscosity of the liquid composition and the coating liquid for forming a catalyst layer became sufficiently high, and cracking was less likely to occur at the time of forming the catalyst layer.

In Ex. 8, the concentration of the copolymer (H) in the dispersion was less than 13 mass %, whereby the viscosity of the liquid composition and the coating liquid for forming a catalyst layer did not become sufficiently high, and cracking was likely to occur at the time of forming the catalyst layer.

Ex. 9, the sum of the concentration of the copolymer (H) and the concentration of the fluorinated solvent in the liquid composition exceeded 35 mass %, whereby the viscosity of the liquid composition became too high, and it was not possible to uniformly disperse it in the coating liquid for forming a catalyst layer, and it was not possible to use it to form the catalyst layer.

In Ex. 10, a fluorinated solvent was not used in the preparation of the liquid composition, whereby the viscosity of the liquid composition and the coating liquid for forming a catalyst layer did not become to be sufficiently high, and cracking was likely to occur at the time of forming the catalyst layer.

In Ex. 11, the sum of the concentration of the copolymer (H) and the concentration of the fluorinated solvent in the liquid composition was less than 17 mass %, whereby the viscosity of the liquid composition and the coating liquid for forming a catalyst layer did not become to be sufficiently high, and cracking was likely to occur at the time of forming the catalyst layer.

In Ex. 12, a hydrocarbon-type alcohol was not used as a dispersion medium, whereby the liquid composition became to be uneven, and it was not possible to use it to form a catalyst layer.

INDUSTRIAL APPLICABILITY

The liquid composition of the present invention is useful as a raw material at the time of forming a catalyst layer or a polymer electrolyte membrane in a membrane electrode assembly.

This application is a continuation of PCT Application No. PCT/JP2016/072683, filed on Aug. 2, 2016, which is based upon and claims the benefit of priority from Japanese Patent Application No. 2015-164627 filed on Aug. 24, 2015. The contents of those applications are incorporated herein by reference in their entireties.

DESCRIPTION OF SYMBOLS

10: membrane electrode assembly, 11: catalyst layer, 12: gas diffusion layer, 13: anode, 14: cathode, 15: solid polymer electrolyte membrane, 16: carbon layer.

What is claimed is:

1. A method for producing a liquid composition, which comprises
    dispersing a copolymer having a structural unit represented by the following formula (u1) and a structural unit derived from tetrafluoroethylene, in a medium containing water and a hydrocarbon-type alcohol and containing no fluorinated solvent, to prepare a dispersion wherein the concentration of the copolymer is from 18 to 26 mass %, and
    mixing the dispersion and a fluorinated solvent so that the sum of the concentration of the copolymer and the concentration of the fluorinated solvent becomes to be from 20 to 35 mass %, to prepare a liquid composition:

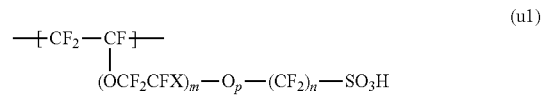

wherein X is a fluorine atom or a trifluoromethyl group, m is an integer of from 1 to 3, p is 0 or 1, and n is an integer of from 1 to 12,
    wherein the fluorinated solvent is at least one member selected from the group consisting of a hydrofluoroether and a hydrofluorocarbon, and
    wherein the hydrocarbon-type alcohol is at least one C1-4 hydrocarbon-type alcohol.

2. The method for producing a liquid composition according to claim 1, wherein the structural unit represented by the formula (u1) is a structural unit represented by the following formula (u11) or formula (u12):

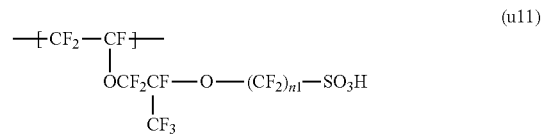

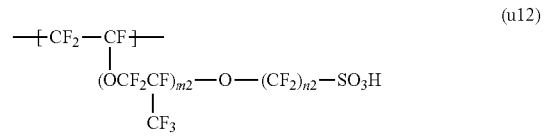

wherein, in the formula (u11) and formula (u12), n1 and n2 are each an integer of from 1 to 8, and m2 is an integer of 2 or 3.

3. The method for producing a liquid composition according to claim 1, wherein the fluorinated solvent is a hydrofluoroether.

4. The method for producing a liquid composition according to claim 1, wherein the hydrofluoroether is 1,1,2,2-tetrafluoroethyl-2,2,2-trifluoroethyl ether, and the hydrofluorocarbon is 1,1,2,2,3,3,4-heptafluorocyclopentane.

5. The method for producing a liquid composition according to claim 1, wherein the hydrocarbon-type alcohol is either one or both of ethanol and 1-propanol.

6. The method for producing a liquid composition according to claim 1, wherein the fluorinated solvent is 1,1,2,2,3,3,4-heptafluorocyclopentane, and the hydrocarbon-type alcohol is ethanol or 1-propanol.

7. A method for producing a coating liquid for forming a catalyst layer, which comprises preparing a liquid composition by the method of claim 1, and mixing the liquid composition and a catalyst to prepare a coating liquid for forming a catalyst layer.

8. A method for producing a membrane electrode assembly for a solid polymer electrolyte fuel cell, comprising an anode having a catalyst layer, a cathode having a catalyst layer and a solid polymer electrolyte membrane disposed between the anode and the cathode, which comprises preparing a coating liquid for forming a catalyst layer by the method of claim 7, and forming the catalyst layer for either one or each of the cathode and the anode by using the coating liquid.

9. A method for producing a membrane electrode assembly for a solid polymer electrolyte fuel cell, comprising an anode having a catalyst layer, a cathode having a catalyst layer and a solid polymer electrolyte membrane disposed between the anode and the cathode, which comprises preparing a liquid composition by the method of claim 1, and forming the solid polymer electrolyte membrane by using the liquid composition.

10. The method for producing a liquid composition according to claim 1, wherein the fluorinated solvent is a hydrofluorocarbon.

* * * * *